Nov. 13, 1962 J. A. DUKE 3,064,128
MEASURING APPARATUS
Filed Oct. 17, 1958 2 Sheets-Sheet 2

*INVENTOR.*
JOHN A. DUKE
BY
ATTORNEY.

United States Patent Office 3,064,128
Patented Nov. 13, 1962

3,064,128
MEASURING APPARATUS
John A. Duke, Roslyn, Pa., assignor to Minneapolis-Honeywell Regulator Company, Minneapolis, Minn., a corporation of Delaware
Filed Oct. 17, 1958, Ser. No. 767,970
7 Claims. (Cl. 250—83.3)

This invention relates generally to guides for electromagnetic radiation, and relates more specifically to guides for conducting radiant energy from a source to a radiant energy responsive device.

A general object of the present invention is to provide a new and improved electromagnetic radiation guide. A more specific object of the invention is to provide a new and improved guide for conducting or transmitting the radiant energy emitted by a source thereof to a device responsive to such radiant energy.

There are countless applications wherein it is necessary to guide or conduct radiant energy to some form of a radiant energy responsive means which actuates associated apparatus. An example of an arrangement for such use is the so-called sapphire rod radiation pyrometer made by the Brown Instruments Division of the Minneapolis-Honeywell Regulator Company, wherein radiant energy is transmitted from its source to a radiation responsive thermopile by a sapphire rod radiation guide. A construction of this type gives highly satisfactory results particularly where high ambient temperatures are encountered, since the sapphire guide is able to withstand temperatures up to about 2,000° C.

Unfortunately, however, the sapphire rod used as a radiation guide in the above mentioned application has certain limitations. One of the most crucial of these limitations is that the sapphire rod is not available for use as a radiant energy guide in lengths over approximately eighteen inches, due to the difficulty of manufacturing sapphire rods above that length. Moreover, where space considerations are vital, the sapphire rod radiant energy guide has serious limitations, since it cannot readily be bent to avoid obstructions. Furthermore, sapphire rods are relatively fragile and expensive.

It is therefore one object of the present invention to provide a new and improved radiant energy guide which overcomes the foregoing limitations and disadvantages of the foregoing sapphire rod guide.

Another object of the present invention is the provision of a new and improved radiant energy guide which can be made and utilized in lengths far in excess of eighteen inches, and which can be readily fabricated so as to transmit radiant energy around obstructions and the like.

The above and other objects, characteristics and other features of this invention will be more fully understood from the following description taken in connection with the accompanying illustrative drawing.

In the drawing:
FIG. 1 is, in part, a vertical, cross section of a furnace having one form of radiant energy guide attached thereto and, in part, an electric circuit diagram showing the connections between a thermal responsive means to which the radiant energy is transmitted by said guide and an electric indicating means connected to said thermal responsive means.

Figure 1:
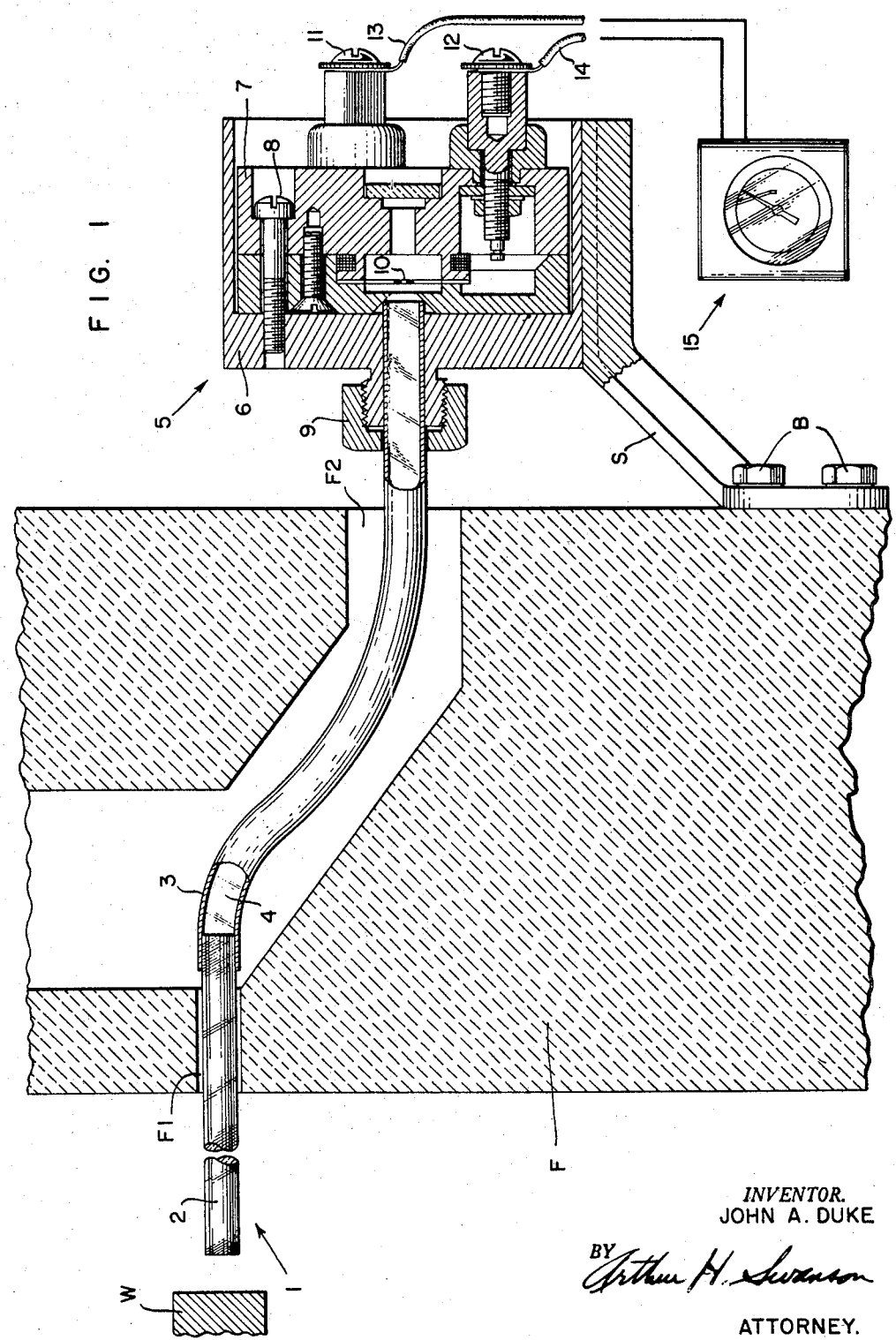

Referring to the drawings, and particularly to FIG. 1 thereof, there is shown one modification of the radiant energy guide of this invention. A furnace or other vessel, adapted to contain a flame or a work piece whose temperature is to be measured, has an outer wall F having an opening F1 communicating with a second opening F2 passing through the wall thereof from the interior of the vessel to the outside thereof.

Such vessels frequently impose drastic limitations as to space.

The radiant energy guide of this invention is generally designated 1 and extends through the openings F1 and F2 of the vessel. Guide 1 has an input radiant energy transmitting means 2 comprising a sapphire rod of quartz $CaF_2$, AgCl, KRS–5, or the like. If the input element 2 is made of sapphire it can withstand temperatures up to about 2,000° C.

That end of transmitting means 2 which is remote from the interior of the furnace is connected to a tubular element 3. Tubular element 3 may be made of metal or ceramic but is of a material which may be readily bent or formed in curved shape to accommodate the requirements of the openings F1 and F2 of the furnace or other vessel. The inside surface 4 of the tubular element 3 is treated so as to have high reflectivity for those bands of radiant energy being used. Electroplated silver is a suitable example for the one micron to five micron band. This coating may be polished so as to transmit the radiant energy involved.

Outside of the vessel or furnace is located a radiant energy responsive means, generally indicated 5. This radiant energy responsive means may be mounted on the wall F of the vessel by a pair of bolts B supporting a bracket S. An example of such a radiant energy responsive means is a pyrometer as disclosed in U.S. Patent 2,357,193, patented August 29, 1944, to T. R. Harrison. The pyrometer constituting this invention includes radiant energy responsive means 5 comprising a housing formed of a front 6 and a rear 7 held together in air-tight relation by a plurality of bolts 8. A collar 9 secures the rear, "cold," outer end of tubular element 3 to radiant energy responsive means 5 in air-tight relation. Means 5 includes as its active element a thermopile 10 of the wagonwheel type. Thermopile 10 is located opposite the end of tubular element 3 so that the radiant energy conducted by the tubular element 3 is directed upon the hot end of the thermopile 10. Thermopile 10 is connected by terminals 11 and 12 to conductors 13 and 14. Conductors 13 and 14 are connected to any suitable indicator 15, such as an electronic potentiometer shown in U.S. Patent 2,423,540, patented July 8, 1947, to W. P. Wills, which gives an indication of the voltage put out by the thermopile 10 and of the changes in such voltage. This voltage is calibrated so as to indicate the temperature in the furnace.

Figure 2:
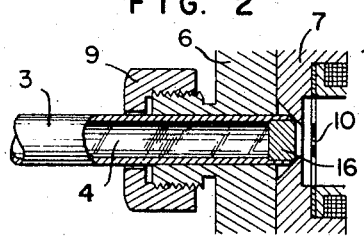
FIG. 2 is a longitudinal, cross section of the rear or "cold" end of the tubular element having an output radiant energy transmitting means secured therein.

FIG. 2 shows a modification of the radiant energy guide. This modification comprises a tubular element 3 secured by a collar 9 to the front element 6 of a radiant energy responsive means 5. Tube 3 has its inner surface 4 of high reflectivity for radiant energy of the wave length being transmitted. Radiant energy responsive means 5 includes a rear casing piece 7 clamped against casing piece 6 in air-tight relation. Within the housing of means 5 formed by pieces 6 and 7 is located a thermopile 10 of the wagon wheel type. Thermopile 10 is located opposite the end of tubular element 3 so that the radiant energy conducted by the tubular element 3 is focused on the thermopile 10. The rear, outer, "cold" end of tubular element 3 is closed by a second or outer radiant energy transmitting means 16. Outer radiant energy transmitting means 16 may be in the shape of a rod not more than 18 inches in length or in the shape of a lens. Means 16 may be made of any of the materials of which the input means 1 may be made. The use of an input transmitting means 1 and of an output transmitting means 16 permits the interior of the tubular element 3 to be evacuated. Such evacuation reduces the effects of high ambient temperature since it permits the long wave lengths originating in the tubular element 3 to be absorbed. Sealing the ends of the tubular element 3 by means of the input means 1 and of the output means 16 protects the reflecting surface 4 because the corrosive gasses which may be present in the ambient atmosphere can not reach the interior of the tubular element 3.

Figure 3:
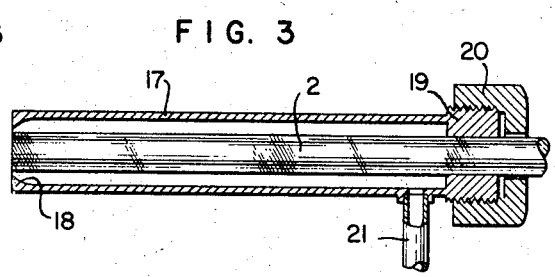
FIG. 3 is a longitudinal, cross section with parts broken away of a second modified form of radiant energy guide with air purge.

FIG. 3 shows a second modified form of radiant energy guide. This guide includes a tube 17 encircling radiant energy transmitting means or rod 2. The inner or "hot" end of tube 17 is flared at 18 toward the means 2 but is spaced therefrom by an annular space. The outer or "cold" end of tube 17 is sealed gas-tight to means 2 by means of a sealing ring 19 which is secured to the outer surface of means 2 and has screw threads which cooperate with mating screw threads on ring 20 so as to clamp the outer or "cold" end of tube 17 between rings 19 and 20. An inlet pipe 21 communicates with the ring-shaped space between the inner wall of tube 17 and the outer wall of means 2. Tube 21 serves as an inlet for purging gas, such as air, which is admitted under pressure and proceeds longitudinally of the tube 17 and is expelled from the open, inner or "hot" end of tube 17. This purge gas cools the means 2 and prevents the "hot" or exposed end of rod 2 and the side walls thereof from being covered with foreign material from the atmosphere of the furnace to which the rod 2 is exposed.

Figure 4:
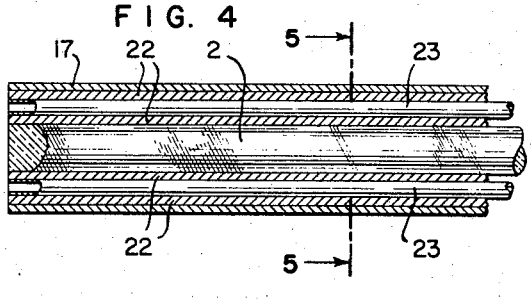
FIG. 4 is a longitudinal, cross section of a third modified form of radiant energy guide with air purge.
Figure 5:
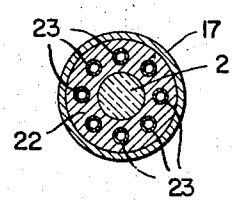
FIG. 5 is a transverse cross section on line 5—5 of FIG. 4 as viewed in direction of the arrows.

FIGS. 4 and 5 show a third modification of the radiant energy guide. This modification comprises an input radiant energy transmitting means 2 surrounded by a layer of packing 22, such as magnesium oxide. Through this layer of packing 22 pass a number of tubes 23. Tubes 23 are connected at their outer or "cold" ends with an inlet pipe, such as pipe 21 of FIG. 3. The outer surface of packing 22 is confined by a tube 17. A purging gas, such as air, is admitted to the outer or "cold" ends of tubes 23 and passes through these tubes to the inner or "hot" ends of tubes 23 adjacent the inner or "hot" end of means 2. The jets of purge gas escaping from the inner or "hot" end of tubes 23 prevents a deposit of foreign, undesirable material on the inner or "hot" end of means 2.

Figure 6:
FIG. 6 is a longitudinal cross section of a fourth modification of radiant energy guide.

FIG. 6 shows a fourth modification of the radiant energy guide. In this modification the inner or "hot" end of the input radiant energy transmitting means 2 is covered by a cap of heat-resisting refractory, protective covering 24. Cap 24 covers the portion of the means 2 in the vessel or furnace and keeps the inner or "hot" end clean without preventing radiant energy from entering the end surface of means 2. The response time of the radiant energy guide is controlled by heat transfer to and from the cap, the thickness and shape of the cap, and the material used in its construction. Temperature range is determined for the most part by the material used in the construction of the cap. Useful life is controlled by the corrosive and erosive characteristics of the material used for the cap and the thickness of the cap.

Figure 7:
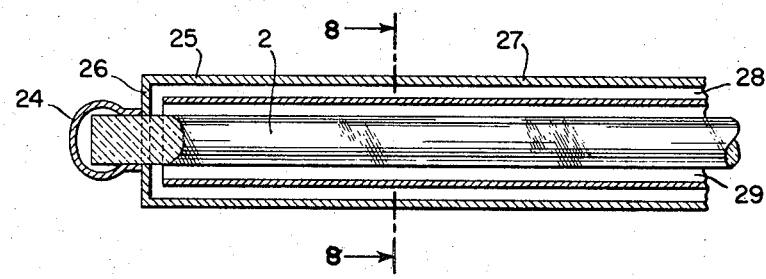
FIG. 7 is a longitudinal cross section of a fifth modification of radiant energy guide with a cap and with an air purge.
Figure 8:
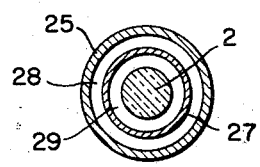
FIG. 8 is a transverse cross section on line 8—8 of FIG. 7 as viewed in direction of the arrows.

FIGS. 7 and 8 show a fifth modification of the radiant energy guide. In this modification a purge gas is employed to protect the input of the radiant energy transmitting means 2 from the effect of heating, corrosion, contamination, and mechanical breakage without cooling the inner or "hot" end of the means 2. In this modification the radiant energy transmitting means 2 is covered at its inner or "hot" end by a cap 24. A tube 25 surrounds means 2 and has its inner or "hot" end closed by a wall 26. A second tube 27 divides the space between the inner wall of the tube 25 and the outer wall of the means 2 into two ring-shaped spaces the outer of which is connected to an inlet 28 and the inner of which is connected to an outlet 29.

What is claimed is:

1. A radiant energy guide including an input radiant energy transmitting means having one surface exposed to the heat to be measured, a packing of refractory material surrounding the longer sides of said means, a plurality of tubes for purge gas extending through said packing substantially parallel to said means, and means for admitting a purge gas to the outer or "cold" end of said tubes so that jets of said purge gas emerge from the inner or "hot" ends of said purge gas tubes adjacent to the surface of said input means exposed to the heat to be measured.

2. A radiant energy guide including, an input radiant energy transmitting rod having one end adapted to be disposed in energy-receiving relation with an energy source, a hollow tubular element having a highly reflective inner surface and having one end disposed in sealing relation with the other end of said input rod and an output radiant energy transmitting rod disposed at the other end of said tubular element in sealing relation therewith, the hollow interior of said tubular element being evacuated whereby to reduce radiant energy absorption and surface corrosion therewith.

3. A radiant energy guide including, an input radiant energy transmitting rod of sapphire having one end adapted to be disposed in energy-receiving relation with an energy source, a tubular metallic element having a highly reflective inner surface and having one end disposed at the other end of said input rod in sealing relation therewith, an output radiant energy transmitting rod of sapphire disposed at the other end of said tubular element in sealing relation therewith, said tubular element being evacuated whereby to reduce radiant energy absorption and surface corrosion therewith, radiant energy responsive means including gas-tight case and a thermopile therein and disposed at the other end of said tubular element and at the other end of said output radiant energy transmitting means in sealing relation with both, and an electronic potentiometer electrically connected to said thermopile to indicate the temperature transmitted by said guide.

4. A radiant energy guide according to claim 1 in which the elongated input radiant-energy-transmitting means comprises a rod.

5. A radiant energy guide according to claim 1 in which the elongated input radiant-energy-transmitting means is made of sapphire.

6. A radiant energy guide including an input radiant-energy-transmitting rod having one end adapted to be disposed in energy-receiving relation with an energy source, a tube surrounding said rod and spaced therefrom and sealed thereto at the outer or "cold" end of said rod, said tube being flared at its inner or "hot" end towards said rod, means for admitting a purge gas to the space between said rod and said tube so that the flared end of said tube expels the purge gas between said rod and said tube, and a tubular element having a highly reflective inner surface for radiant energy of the wave lengths transmitted by said rod and sealed at its inner or "hot" end to the outer or "cold" end of said rod.

7. A radiant energy guide including an elongated input-radiant-energy-transmitting rod having one end adapted to be disposed in energy-receiving relation with an energy source, a hollow tubular element having a highly reflective inner surface and having one end disposed in receiving relation with the inner or "hot" end of said input rod so as to receive and transmit radiant energy transmitted by said rod, an elongated output-radiant-energy-transmitting rod having one end adapted to be disposed in energy-receiving relation with said tubular element so as to receive and transmit radiant energy transmitted by said tubular element, radiant-energy-responsive means including a gas-tight case and a thermopile therein and disposed at and sealed gas-tight to the outer or "cold" end of said tubular element and of said output rod, and means electrically connected to said thermopile to indicate temperature in response to the radiant energy transmitted by said guide.

References Cited in the file of this patent

UNITED STATES PATENTS

| | | |
|---|---|---|
| 1,318,516 | Wallis et al. | Oct. 14, 1919 |
| 1,894,109 | Marcellus | Jan. 10, 1933 |
| 1,900,779 | Thwing | Mar. 7, 1933 |
| 1,936,514 | Lengnick | Nov. 21, 1933 |
| 2,460,314 | Thomson | Feb. 1, 1949 |
| 2,493,078 | Mead | Jan. 3, 1950 |
| 2,692,950 | Wallace | Oct. 26, 1954 |
| 2,709,367 | Bohnet | May 31, 1955 |
| 2,720,593 | Richards et al. | Oct. 11, 1955 |
| 2,727,154 | Goldsworthy | Dec. 13, 1955 |
| 2,755,389 | Jones et al. | July 17, 1956 |
| 2,773,246 | Brook | Dec. 4, 1956 |
| 2,857,522 | Jones | Oct. 21, 1958 |

FOREIGN PATENTS

| | | |
|---|---|---|
| 708,950 | Great Britain | May 12, 1954 |

OTHER REFERENCES

Ragan: Microwave Transmission Circuits, published by McGraw-Hill, Inc., New York, 1948, pp. 124 to 130.